US006467080B1

United States Patent
Devine et al.

(10) Patent No.: US 6,467,080 B1
(45) Date of Patent: Oct. 15, 2002

(54) SHARED, DYNAMICALLY CUSTOMIZABLE USER DOCUMENTATION

(75) Inventors: Kathryn Willbrandt Devine, Morgan Hill; Virginia W. Hughes, Jr., Hollister; Barbara Jean Kilburn, Saratoga; David Edward Shough, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,557

(22) Filed: Jun. 24, 1999

(51) Int. Cl.[7] .............................................. G06F 9/455
(52) U.S. Cl. ........................ 717/123; 707/500; 717/162
(58) Field of Search ............................... 717/3, 11, 100, 717/120, 123, 162, 174; 703/23; 345/866; 707/500, 511, 200

(56) References Cited

U.S. PATENT DOCUMENTS

| | | | | |
|---|---|---|---|---|
| 4,800,485 A | | 1/1989 | Ackroff et al. ............. | 364/200 |
| 5,301,270 A | * | 4/1994 | Steinberg et al. ........... | 345/866 |
| 5,361,361 A | | 11/1994 | Hickman et al. ........... | 395/700 |
| 5,530,869 A | | 6/1996 | Salle .......................... | 395/700 |
| 5,557,730 A | * | 9/1996 | Frid Nelsen ................ | 345/839 |
| 5,666,411 A | | 9/1997 | McCarty ........................ | 380/4 |
| 5,862,395 A | * | 1/1999 | Bier .............................. | 712/1 |
| 5,870,725 A | | 2/1999 | Bellinger et al. ............. | 705/45 |
| 5,893,916 A | * | 4/1999 | Dooley ........................ | 707/523 |
| 5,903,905 A | * | 5/1999 | Anderson et al. ........... | 707/526 |
| 5,949,999 A | * | 9/1999 | Song et al. .................. | 717/127 |
| 6,002,867 A | * | 12/1999 | Jazdzewski .................... | 717/1 |
| 6,041,303 A | * | 3/2000 | Mathews ....................... | 705/1 |
| 6,072,461 A | * | 6/2000 | Haran .......................... | 345/629 |
| 6,108,661 A | * | 8/2000 | Caron et al. ................ | 707/102 |
| 6,122,647 A | * | 9/2000 | Horowitz et al. ........... | 707/513 |
| 6,182,095 B1 | * | 1/2001 | Leymaster et al. ......... | 707/515 |
| 6,289,460 B1 | * | 9/2001 | Hajmiragha ................. | 713/200 |

FOREIGN PATENT DOCUMENTS

| | | | |
|---|---|---|---|
| EP | 0 881 567 A1 | 2/1998 | ............. G06F/9/44 |
| WO | WO 98/53396 | 11/1998 | ............. G06F/9/44 |

OTHER PUBLICATIONS

IBM Research Disclosure, "Extra Transaction Suppression During Web Browser Collaboration", Oct. 1998, 41460.
IBM Research Disclosure, "Mark Up Language Facility for Notes", Jun. 1998, 410131.

(List continued on next page.)

Primary Examiner—Anil Khatri
(74) Attorney, Agent, or Firm—Brian C. Kunzler

(57) ABSTRACT

A user-generated documentation integration system operates in conjunction with a software application created by a manufacturer and executable on a computer processor for the benefit of a user. A documentation repository or group of documentation repositories may be provided for storing user-generated documentation relating to the software application. The software application may also include a linker module that maintains a link to a documentation repository so a user may access the user-generated documentation from within the software application. The user-generated documentation may comprise user help files pertaining to the software application. The user help files may be accessed through a window available within the software application, which is adapted to display a listing of available user help files that are individually selectable from the listing by a user for presentation on a display device. In an illustrated example, the window is implemented as a program dialog box having a frame in which a listing of user help files is displayed, each of which may be selectively opened and viewed on a computer screen. Access to the user-generated documentation may be selectively filtered.

39 Claims, 8 Drawing Sheets

OTHER PUBLICATIONS

IBM Technical Disclosure Bulletin, "Internet Soft Parcel Delivery and/or Archiving System", vol. 40 No. 06, Jun. 1997, pp. 177–179.

IBM Technical Disclosure Bulletin, "Design of the Application Collection Object for Network Installation", vol. 39 No. 05, May 1996, pp. 123–125.

IBM Technical Disclosure Bulletin, "Multimedia Online Help Information Enabler", vol. 39 No. 03, Mar. 1996, pp. 341–344.

Kramer, "API documenation from source code comments a case study of Javadoc", ACM pp 147–153, Apr. 1999.*

Dourish et al, "A programming model for active documents", ACM UIST, pp 41–50, vol. 2,2, Mar. 2000.*

Salminen et al, "Requirements for XML document database system", ACM DocEng, pp 85–94, 2001.*

Lyytikainen et al, "Graphical information models as interface for web document repositories", ACM AVI, pp 261–265, 2000.*

Curbow et al, "Desiginig the OpenDoc Human interface", ACM DIS, pp 83–95, 1997.*

* cited by examiner

SHARED, DYNAMICALLY CUSTOMIZABLE USER DOCUMENTATION

BACKGROUND OF THE INVENTION

1. The Field of the Invention

The present invention relates generally to systems for providing informational assistance relating to software applications. More particularly, the present invention relates to a computer-implemented system for generating, maintaining, and providing user-generated software application documentation and making the documentation selectively sharable among various users.

2. The Relevant Technology

The computer and computer software fields are experiencing a great explosion in the growth of technology. The rapid generation of increasingly complex computer technology can be seen as both a boon and a bane. Increasingly powerful computers and the highly complex computer programs that operate thereon provide benefits on a scale previously unseen. Computer operators are now provided with tools that achieve tasks in a fraction of the time previously required, if indeed those tasks could previously have been performed at all.

Nevertheless, this increasing sophistication comes at a price. For instance, the increasingly sophisticated computer programs now available require large amounts of specialized user training and accustomization in order to provide productivity gains. Additionally, installing, maintaining, and using such programs is effectively becoming an increasingly daunting task.

Consider the situation where a computer administrator is faced with the task of installing a complex computer program to operate on a large scale such as, for instance, within a government entity, university, or large business organization. The computer program often comes packaged with a myriad of installation configurations and options. Additionally, the computer program may need to be installed differently or configured differently for different departments within a given organization. Likewise, where the program is being administered over a widely dispersed computer system and across different platforms, it may require a high degree of customization. Such customization may be customer-specific.

Many program installations are actually just updates of existing versions of the program. In such cases, many transitional considerations must be properly understood in the "migration" between the earlier version and the later version that is to be installed. For example, complex operations may be necessary for the installation of the later program. These operations may require that operators be aware of company, department, or site specific policies, procedures, and/or guidance to successfully conduct such operations.

A disadvantage of current program installation systems is the generally limited amount of information available to operators and administrators during installation. Furthermore, current program installation systems provide no mechanism for providing installation and configuration information, policies, procedures, and guidelines specific to the company, department, or site during and prior to the installation. This lack of information availability to system operators and administrators often results in wasted resources due to incorrect installations of complex computer programs caused by the operators' or administrators' ignorance of the company, department, or site specific policies, procedures, or guidelines regarding correct configuration for installation.

One manner in which the field of computer technology has dealt with the increased complexity of computer programs is through interactive help programs provided within graphical user interfaces (GUI). Within modern interactive computer programs, a user is often presented with intricate help features through the GUI. Within the GUI, functions of the program may be represented as objects through graphical representations. In these interfaces, many previously coded programming commands are replaced with selectable two-dimensional or three-dimensional graphic images on a computer display device. Icons may symbolically indicate the type of operation the computer system will execute if the icon function is selected.

In addition, many such interfaces utilize multiple "windows" displayed on the display device, each with combinations of text and graphics to convey information to a user. Each window may take the form of any of a variety of objects such as a file folder, loose-leaf binder, or simple rectangle. The windows may overlap one another with the "top" window fully visible and representing a current work file. Windows not currently in use can be minimized for quick access at a later point. Users are permitted to operate on and manipulate the window contents and the window itself, as if the image constituted an actual object.

Nevertheless, such powerful and intuitive help systems have not yet been adequately designed to provide for integration of user-generated information, policies, procedures, and guidelines within a program. Likewise, these help systems have generally not been configured to modify help files or otherwise provide information from the manufacturer that becomes available after the installation program and software application have been distributed from the manufacturer to the customer. In particular, administrators, operators, and users are currently unable to employ such help systems to share information, policies, procedures, and guidelines related to the installation, configuration, and use of a software application with other users who need or could benefit from access to such information.

In view of the foregoing discussion, it is clearly desirable to provide methods and apparatus for the integration of user-generated, sharable documentation into complex software applications and programs. Such user-generated software documentation would be highly advantageous if it were made seamlessly available to users, operators, and administrators who use, install, configure, maintain, migrate, or otherwise interact with an installation program or other software application.

Such documentation would also be highly advantageous if collected into a central repository or group of repositories where the documentation would be readily accessible to users, even from remote locations. Implementation of methods and/or apparatus for selectively controlling the availability of such documentation to certain users and groups of users would also be advantageous.

OBJECTS AND BRIEF SUMMARY OF THE INVENTION

The apparatus of the present invention has been developed in response to the needs remaining in the present state of the art, and in particular, in response to the problems and needs not yet addressed by currently available help systems. Thus, it is an overall objective of the present invention to provide a user-generated documentation integration system with accompanying methods for use, generation, and training for overcoming some or all of the problems discussed above as existing in the art.

In embodiments disclosed herein, the user-generated documentation integration system is used for providing shared, dynamically customizable documentation for use in connection with a software application. The user-generated documentation integration system preferably comprises a processor for executing instructions and a memory device having thereon modules of operational data and executable code for execution by the processor.

In one embodiment, the modules of operational data (data) and executable code (executables) comprise a software application, created by a manufacturer and executable on a computer processor for the benefit of a user. A documentation repository or group of documentation repositories may be provided for storing user-generated documentation relating to the software application. The software application may also include a linker module that maintains a link to a documentation repository so a user may seamlessly access user-generated documentation from within the software application as if the documentation were integral to the software application.

In one embodiment, the documentation repository comprises a directory that is generated by an operating system and that is located external to the software application. The documentation repository may reside on a network at a location remote from the software application. The network on which the documentation repository resides may be the Internet. The documentation repository is preferably implemented so it appears to a user to be a seamlessly integrated part of the software application, regardless of the documentation repository's physical location.

In one embodiment, the user-generated documentation comprises user help files pertaining to the software application that each contain documentation generated by a user or customer related to the software application. A file manager may be provided to maintain both the documentation repository and the help files stored in the documentation repository.

The user-generated documentation may be accessed through a window available within the software application. The window may be adapted to display a listing of available user help files, which may be individually selectable from the listing by a user for presentation on a display device. The window may also include an interface that enables a user to select a desired documentation repository from among a group of one or more available documentation repositories. A viewer module may be provided having one or more viewers capable of displaying the user-generated documentation on a display device for the benefit of a user.

In one embodiment, a training module employs user-generated documentation to provide training related to the software application. The provided training typically comprises displaying the user-generated documentation to a user or trainee in a selected order and manner adapted for training purposes.

A documentation generation module may be provided. The documentation generation module may comprise one or more programs configured to create and edit user help files and other user-generated documentation.

A filter module may also be provided and may selectively control access to the user-generated documentation stored in one or more of the documentation repositories. The filter module may also include a security overlay configured to selectively grant to users having designated access rights access to the user-generated documentation. The filter module may further include a group assignor adapted to assign users to groups having rights to access the user-generated documentation.

A standard help module may also be present in the software application. The standard help module may provide pre-defined help files containing information regarding the use of the user-generated documentation integration system and may be called concurrently with an invocation of the user-generated documentation access window.

In one embodiment, a method for providing sharable, dynamically customizable software documentation may comprise providing user-generated documentation relating to a software application and storing the user-generated documentation in a documentation repository. The user-generated documentation may be selected, accessed, and displayed on a display device according to the needs of a user and for the benefit of a user.

A method of providing training to a user may employ user-generated documentation. The method may comprise displaying user-generated documentation to a user in an order and a manner beneficial for training purposes, and may also include evaluate of the training by administering a test or quiz.

In one embodiment, a method for generating user documentation may include generating new help files using a documentation generation program, editing existing user help files using a documentation generation program, and saving the new or edited user help files into selected documentation repositories.

These and other objects, features, and advantages of the present invention will become more fully apparent from the following description and appended claims, or may be learned by the practice of the invention as set forth hereinafter.

BRIEF DESCRIPTION OF THE DRAWINGS

The manner in which the above-recited and other advantages and objects of the invention are obtained will be readily understood from the following more particular description of the invention. Specific embodiments are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of certain presently preferred embodiments of the invention.

FIGS. 1 through 8 are schematic block diagrams and flow charts that illustrate in more detail the preferred embodiments of the present invention. The schematic block diagrams illustrate certain embodiments of modules for performing various functions of the present invention. In general, the represented modules include therein executables and operational data for operation within a computer system of FIG. 1 in accordance with the present invention.

As used herein, the term executable code, or an "executable," is intended to include any type of computer instruction and computer-executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, an executable could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system bus or network.

Figure 1:
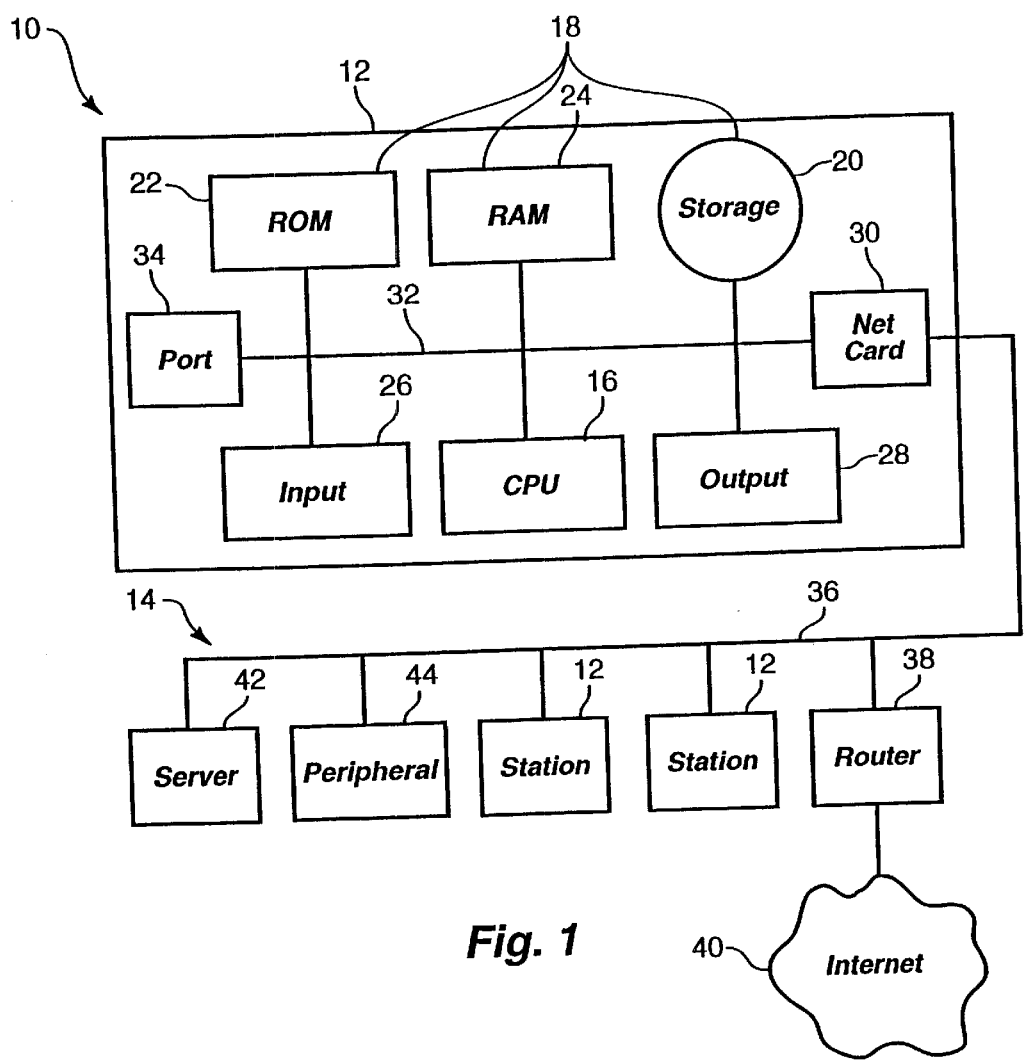
FIG. 1 is a schematic block diagram illustrating one embodiment of a computer system for implementing the user-generated documentation integration system of the present invention.

FIG. 1 is a schematic block diagram that illustrates a computer system 10 in which modules of executable code and operational data, operating in accordance with the present invention, may be hosted on one or more computer stations 12 in a network 14. The network 14 may comprise a wide area network (WAN) and may also comprise an interconnected system of networks, particular examples of which are the Internet and the World Wide Web.

A typical computer station 12 may include a processor or CPU 16. The CPU 16 may be operably connected to one or more memory devices 18. The memory devices 18 are depicted as including a non-volatile storage device 20 such as a hard disk drive or CD ROM drive, a read-only memory (ROM) 22, and a volatile, random access memory (RAM) 24.

The computer station 12 or system 10 may also include one or more input devices 26 for receiving inputs from a user or from another device. Similarly, one or more output devices 28 may be provided within, or be accessible from, the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28 the network card 30, and one or more additional ports 34. The system bus 32 and a network backbone 36 may be thought of as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or, as depicted, a system 40 of interconnected networks (an internetwork 40) such as the Internet 40. The individual stations 12 communicate with each other over the backbone 36 and/or over the Internet 40 with varying degrees and types of communication capabilities and logic capability.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
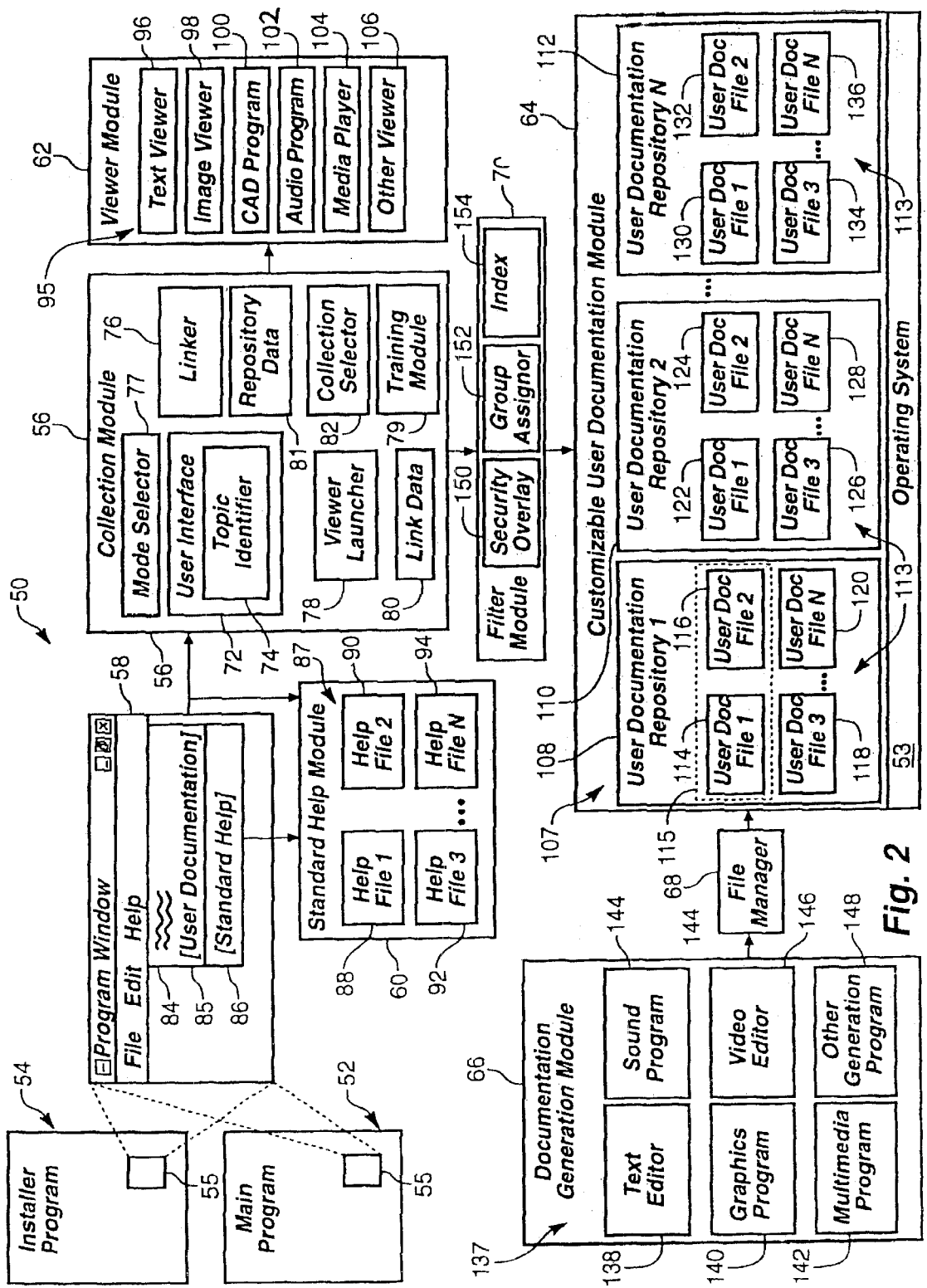
FIG. 2 is a schematic block diagram illustrating one embodiment of a user-generated documentation integration system of the present invention including user documentation collections.

Referring now to FIG. 2, a user-generated documentation integration system 50 of the present invention is shown in one embodiment to include a plurality of modules containing executable code and operational data suitable for operation by the CPU 16 and storage within the memory devices 18 of FIG. 1. The memory devices 18 in which the modules of the present invention are located may also be distributed across both local and remote computer stations 12.

In the depicted embodiment of FIG. 2, the user-generated documentation integration system 50 generally comprises a main program 52, an installation program or installer program 54, a collection module 56, a user interface construct such as a program window 58, a standard help module 60, a viewer module 62, a customizable user documentation module 64, a documentation generation module 66, a file manager 68, and a filter module 70.

The program 52 is, in the depicted embodiment, stored on a common memory device 18 with the installation program 54. The installation program 54 is preferably configured to conduct an installation of the program 52. Nevertheless, the program 52 may exist independently from the installation program 54. Accordingly, the features and benefits of the present invention may also be applied to a computer program or software application, such as the program 52, absent the installation program 54. The program 52 and the installation program 54 are typically generated by a software manufacturer and distributed to a customer or user to be used for the benefit of the customer or user.

Preferably, the installation program 54 is configured to install the program 52 and may interact with a user through the program window 58. A call or control module 55 may be implemented for calling up the program window 58. In the depicted embodiment, the program 52 and installer program 54 are shown linked through the control 55 with the program window 58. The program window 58 may be local to the program 52 or installer program 54 or may be remote thereto. The program window 58 may be configured for use during operation of either the installer program 54, the program 52, or both the installer program 54 and the program 52.

The control module 55 may be embodied as a program window, a dialog, a pull-down menu, a pop-up menu, any other control device, or combination of control devices that may enable a user to selectively invoke the standard help module 60, the program window 58, and the collection module 56. The program window 58 may be local to the control module 55 or may be remote thereto.

The collection module 56, in the depicted embodiment, may include a user interface 72, a topic identifier 74, a linker 76, a viewer launcher 78, a training module 79, link data 80, and training data 81. In the depicted embodiment, the collection module 56 is invokable from the program window 58 through a user documentation menu item 84.

Figure 4:
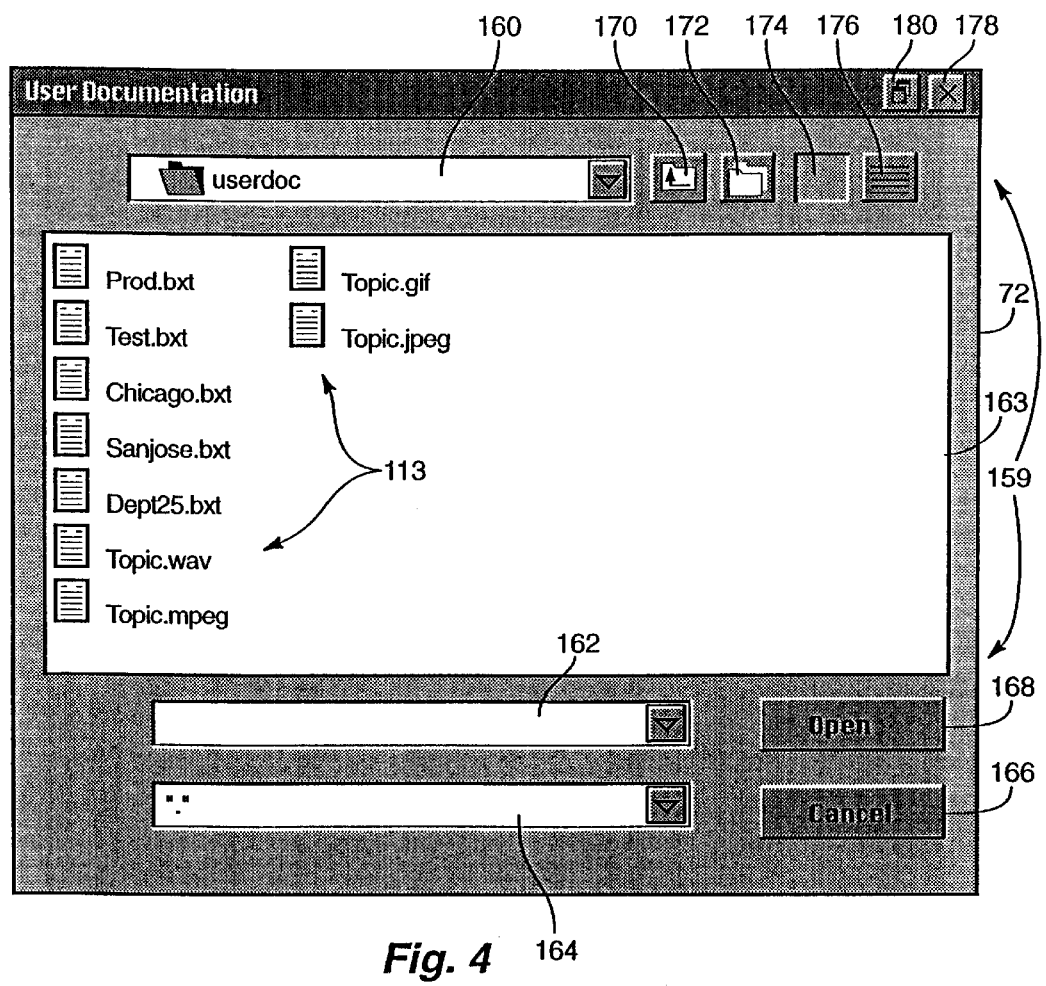
FIG. 4 is one embodiment of a graphical representation of a user interface corresponding to the collection module of FIG. 2.

As shown, invocation of the collection module 56 may concurrently invoke the standard help module 60. While the operation of the collection module 56 is preferably transparent to the user, invocation of the collection module 56 preferably causes the user interface 72 to be displayed to a user. In one embodiment, the user interface 72 cooperates with the topic identifier 74 to display to the user a listing or other indication of the available user-generated documentation. The user interface 72 may comprise a dialog box, a menu, or other suitable software construct adapted to enable a user to view and interact with the user-generated documentation. FIG. 4 shows one example in which the user interface 72 comprises a dialog box.

Preferably, the linker 76 corresponds the collection module 56 to an available user documentation collection or documentation repository 107 so a user may access the documentation repository 107 through the user interface 72 of the collection module 56. The linker 76 employs the link data 80, which may comprise a pointer or any other data structure, suitable to maintain a link or relationship between the collection module 56 and a documentation repository 107.

In the depicted embodiment, the viewer launcher 78 is configured to launch a viewer 95 to display on a display device user-generated documentation selected by a user from a listing displayed by the topic identifier 74. The repository selector 82 may be adapted to enable a user to select a documentation repository 107 from among a group of available documentation repositories 108, 110, 112 displayed to a user through the user interface 72.

In the depicted embodiment, the collection module 56 includes a mode selector 77 adapted to offer a user the option of employing the user-generated documentation for training purposes or alternatively as an information resource. The mode selector 77 invokes the training module 79. The training module 79 may employ training packages 81 or training data 81 to display user-generated documentation to a user in an order and manner beneficial for training purposes. The training module 79 may optionally be configured to conduct assessment of the provided training. For example, the training data 81 may include a test, quiz, or other desirable assessment to be administered by the training module 79 after user-generated documentation has been displayed to a user for training purposes.

Referring to the program window 58, the program window 58, in the depicted embodiment, may optionally include a user documentation menu item 84 and a standard help menu item 86. Both are shown within a pull-down window 85. The standard help menu item 86 may be configured to invoke or call the standard help module 60. The user documentation menu item 84 may be configured to invoke or call the collection module 56 and optionally, as in the depicted embodiment, may be configured to concurrently call the standard help module 60, as previously discussed, to provide help pertaining to the employment of the user-generated documentation integration system 50. Once invoked, the standard help module 60 may also make accessible all of the help topics 87 available in the program 52 or installation program 54.

The standard help module 60, in the depicted embodiment, may include a plurality of help topics 88, 90, 92, and 94 collectively referenced as the help topics 87. Typically, the help topics 87 of a standard help module 60 are defined and provided by the software manufacturer before the program 52 or installation program 54 is distributed to a customer. The help topics 87 are generally not modifiable or otherwise alterable by a customer or user.

The viewer launcher 78 of the collection module 56 may invoke the viewer module 62. The viewer module 61 may also be invoked by any suitable means known to those skilled in the relevant art. In the depicted embodiment, the viewer module 62 may include one or more programs for viewing electronic files, including but not limited to a text viewer or text file viewer 96, an image or image file viewer 98, a computer-aided design program 100, an audio or audio file program 102, a media player or media program 104, or other viewer program 106. The aforementioned programs are collectively referred to herein as viewers 95.

The user documentation module 64, in the depicted embodiment, may include one or more user documentation collections 107 or documentation repositories 107. The customizable user documentation module 64 may be stored on a memory device 18 in the context of, or under the control of, any computer operating system 53.

A documentation repository 107 is typically a defined storage location on one memory device 18 (e.g., a hard disk drive 20) and may be implemented differently under the various computer operating systems 53 that are currently available. For example, a documentation repository 107 is, in one embodiment, implemented as a directory or a folder on a storage device 18, but may be implemented using any suitable software construct or data structure known to those skilled in the relevant art for storing or containing electronic and digital data. Accordingly, the documentation system 50 is independent of any particular operating system 53, and thus may be implemented and employed on any operating system 53, currently known or hereafter developed.

A documentation repository 107 may be local to the program 52 or the installation program 54 or may be remote thereto. For example, the documentation repository 107 may be stored on any storage device 18, and the storage device 18 may be local to the computer station 12 located at a remote location on a network 14. Furthermore, the documentation repository 107 may be located at a remote location accessible through the Internet 40. Thus, the documentation repository 107 may, for example, be located at a company headquarters, and a user thousands of miles away may seamlessly and transparently access user-generated documentation contained therein by accessing the documentation repository 107 across a network 14, such as the Internet 40.

Each documentation repository 107 preferably contains one or more user documentation files 113. For example, documentation repository 108 is shown containing user documentation files 114, 116, 118, 120; documentation repository 110 is shown containing user documentation files 122, 124, 126, 128; and documentation repository 112 is shown containing user documentation files 130, 132, 134, 136.

Each user documentation file 113 is preferably configured to contain user-generated documentation. The user-generated documentation may comprise, for example, policies, procedures, or other information pertaining to the use of the program 52. The user documentation files 113 may alternatively comprise procedures for use of the installer program 54 in installing the main program 52, may be specific instructions for use of the program 54, data of the program 54, or company or organization policies. Thus, many different types of user-generated documentation may be integrated into the program 52 or installer program 54 under the present invention.

Typically, the user documentation files 113 comprise electronic files of various types, including but not limited to text files, image files, computer aided design files, audio files, graphics files, and multimedia files. The user documentation files 113 may comprise any type of computer readable file suitable for containing information relating to the program 52 or the installation program 54. The user documentation files 113 are typically provided by a user or customer separate from the program 52 or the installer program 54.

In the depicted embodiment, the user documentation files 113 of any given documentation repository 107 may be further subdivided and referenced in user documentation subsets 115. The composition of and the allowed access to the user documentation subsets 115 may be controlled by the filter module 70 or may be otherwise controlled by the operating system 53.

In the depicted embodiment, the documentation generation module 66 may include documentation generation programs 137. The documentation generation programs 137 may include one or more of a word processor or text editor 138, a graphics editor or graphics program 140, a multimedia program 142, a sound program 144, a video program or video editor 146, or other generation program 148. A documentation generation program 137 may be any program suitable for generating user documentation files 113 of the types described generally herein. The documentation generation programs 137 are typically separate from the program 52 and the installer program 54 and may simply be standard separately-licensed applications such as a word processor or graphics program.

The documentation generation programs are typically configured to create new user documentation files 113 and to edit existing user documentation files 113. The documentation generation module 66 may also be used to configure, update, and otherwise maintain the user documentation files 113. Typically, the documentation generation module 66 is used in cooperation with the file manager 68.

In the depicted embodiment, the file manager 68 is configured to place a user documentation file 113, previously generated or edited with a documentation generation program 137, into a designated documentation repository 107. The file manager 68 may be local to a documentation generation program 137 or may comprise a stand-alone program configured for the management and administration of electronic files.

The file manager 68 may also be configured for employment in the creation and/or maintenance of documentation repositories. For example, the file manager 68 may be employed to create a documentation repository, move a documentation repository, delete a documentation repository, update a documentation repository, or perform other useful maintenance tasks related to a documentation repository. The file manager 68 may comprise the file utilities incorporated into most available operating systems.

In the depicted embodiment, the filter module 70 selectively controls access to one or more user documentation files 113 contained in one or more documentation repositories 107. The filter module 70 may include a security overlay 150, a group assignor 152, and an index 154. The security overlay 150 may selectively grant access to user documentation files 113 only to those users who have previously been assigned rights to gain such access.

The group assignor 152 may be configured to operate in cooperation with the index 154 to assign users to groupings of users maintained by the index 154 having access to a designated documentation repository 107. For example, a system administrator may use the filter module 70 to restrict access to a particular type or subset of user-generated documentation to those users of the program 52 having a need for access thereto, thus protecting such documentation from unauthorized disclosure. The filter module 70 may be configured to selectively control access to only a user documentation subset 115 of all user documentation files 113 contained in a documentation repository 107. In such a case, the authorized users may be listed in the index 154 as being authorized to view a particular documentation file subset 115, while all other users are listed as unauthorized. When a particular user attempts to access a particular user documentation file 113, the collection module 56 via the filter module 70 checks the index 154 and determines whether the requesting user is listed as having access to the documentation file subset 115 to which the requested documentation file 113 belongs. If so, the user would be provided access.

The filter module 70 may be implemented through employment of the security features available in most operating systems, may be implemented through a security program external to the software application, or through any other software code or construct that implement the functions of the security module 70 as described generally herein.

Figure 3:
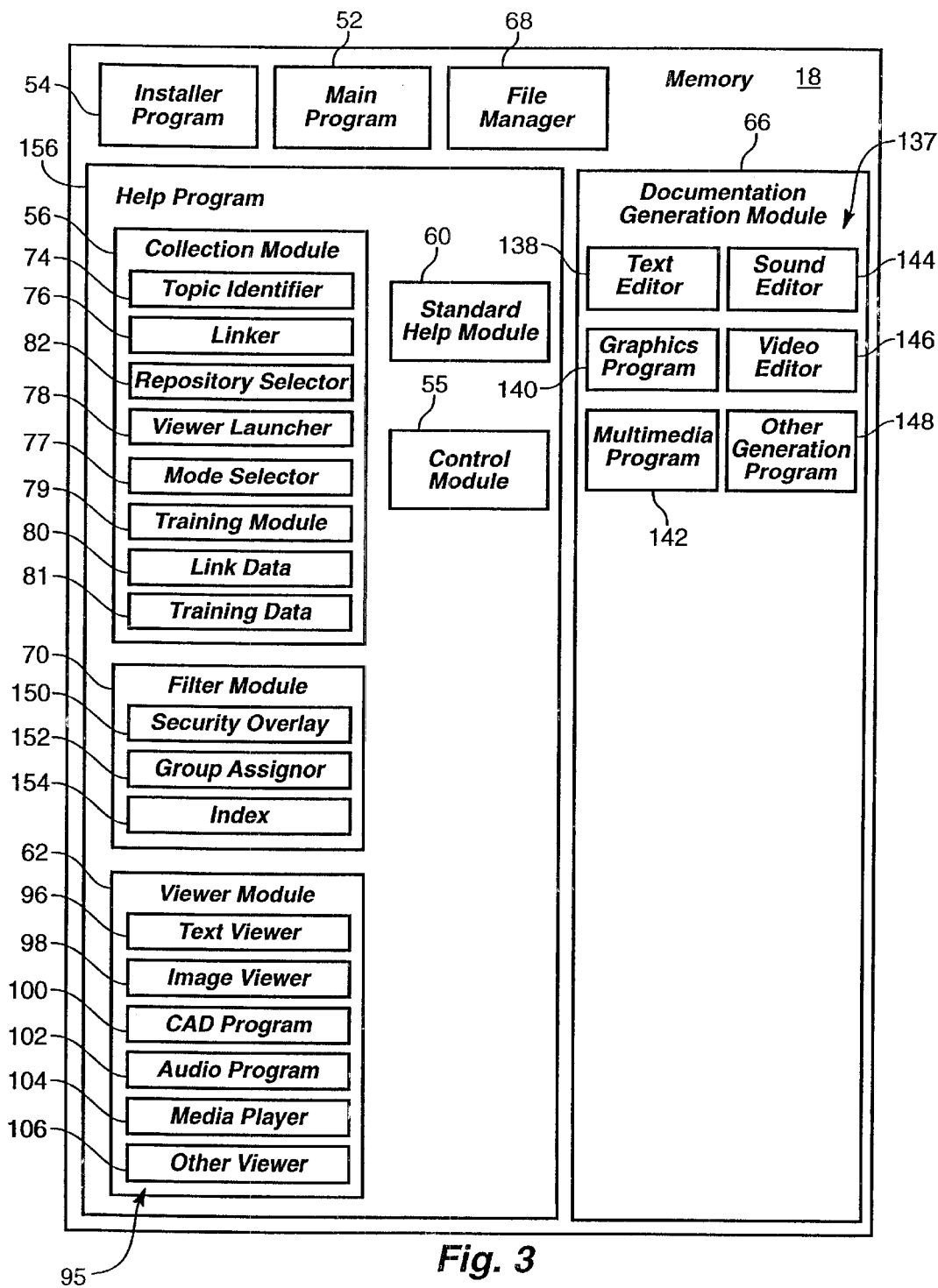
FIG. 3 is a schematic block diagram of one embodiment of a storage device containing therein modules for effecting the user-generated documentation integration system of FIG. 2.

FIG. 3 illustrates one embodiment of the relevant modules for performing the functions of FIG. 2. The modules of FIG. 3 are shown stored on a common storage device 18 such as a CD ROM disk. Nevertheless, the modules of FIG. 3 may be stored in separate storage devices 18, and even on different types of storage devices 18.

FIG. 3 illustrates the main program 52, the installation program 54, the file manager 68, the documentation generation module 66, and a help module 156. The help module 156 may exist local to either the installation program 54, the main program 52, or both. The help module 156 may alternatively exist external to the installation program 54 and/or main program 52, in which case the help module 156 is invoked or called by the main program 52 or installation program 54.

Similarly, the file manager 68 preferably exists local to one or more of the user documentation generators 137, but may alternatively exist external to the user documentation generators 137. Typically, if the file manager 68 exists external to the user documentation generators 137, the file manager 68 is employed independently as a separate software application or software tool. Nevertheless, the help program 156 and the file manager 68 are stored on one or more storage devices 18.

The documentation generation module 66 contains examples of the various user documentation generators 137 available including a text editor 138, a graphics program 140, a multimedia program 142, a sound editor 144, a video editor 146, and another documentation generation program 148. The user documentation generators 137 may be stored on a single storage device 18 and may also be stored on separate storage devices 18.

The help module 156 includes the control module 55, the standard help module 60, the collection module 56, the viewer module 62, and the filter module 70. The standard help module 60, as known in the relevant art, typically includes information relating to the main program 52 and the installation program 54. This information is typically embodied in the form of help topics 87 of FIG. 2, which are defined and prepared by the manufacturer before shipment to a customer or user Shown within the collection module 56 are the user interface 72, the topic identifier 74, the linker 76, the mode selector 77, the viewer launcher 78, the training module 79, the link data 80, and the training data 81. Shown within the viewer module 62 are the text viewer or text file viewer 96, the image or image file viewer 98, the computer-aided design program 100, the audio or audio file program 102, the media player or media program 104, or other viewer 106. Shown within the filter module are the security overlay 150, the group assignor 152, and the index 154.

All of the modules illustrated in FIG. 3 are configured and adapted for the purposes and uses described above in the description related to FIG. 2.

FIG. 4 illustrates one embodiment of the user interface 72. Seen therein are various buttons 159, a documentation repository selection control 160, a user documentation file display 163, a file name display 162, and a file filter 164. In the depicted embodiment, the documentation repository selection control 160 comprises the interface through which a user may interact with the repository selector 82 of FIG. 2.

The user documentation file display 163, in the depicted embodiment, is employed by the topic identifier 74 to display a listing of user documentation files 113 (see FIG. 2) to a user. In one embodiment, designating a file 113, for example, by clicking or double-clicking on a file 113 with a pointing device causes the file 113 to be displayed on a display device for a user. The file name selector 162 and the file filter 164 comprise tools configured to enable a user to select and identify user documentation files 113.

The various buttons 159 shown in the depicted embodiment include a cancel button 166 for closing the user interface 72, an open button 168, an up button 170, a documentation repository button 172, a user documentation file list button 174 for obtaining a simplified listing of user documentation files 113 (see FIG. 2), a user documentation file details button 176 for obtaining a detailed listing of user documentation files 113, an exit user interface button 178 for closing the user interface, and a minimize user interface button 180 for minimizing the user interface but retaining it as an active process.

The open button 168, in the depicted embodiment, may be configured to invoke the viewer launcher 78 of FIG. 2. The up button 170 and the documentation repository button 172 may be configured to enable a user to rapidly select a documentation repository 107 of FIG. 2 from among a group of documentation repositories 107.

FIG. 4 is but one example of a graphical representation of the user interface 72 and should not be considered limiting of the type, appearance, or nature of a user interface 72 of the present invention. Suitable types of user interfaces 72 are limited only in that they should be capable to serve as the medium by which a customer or user may interact with the user-generated documentation embodied as user documentation files 113 of FIG. 2 and contained in documentation repositories 107 of FIG. 2.

Figure 5:
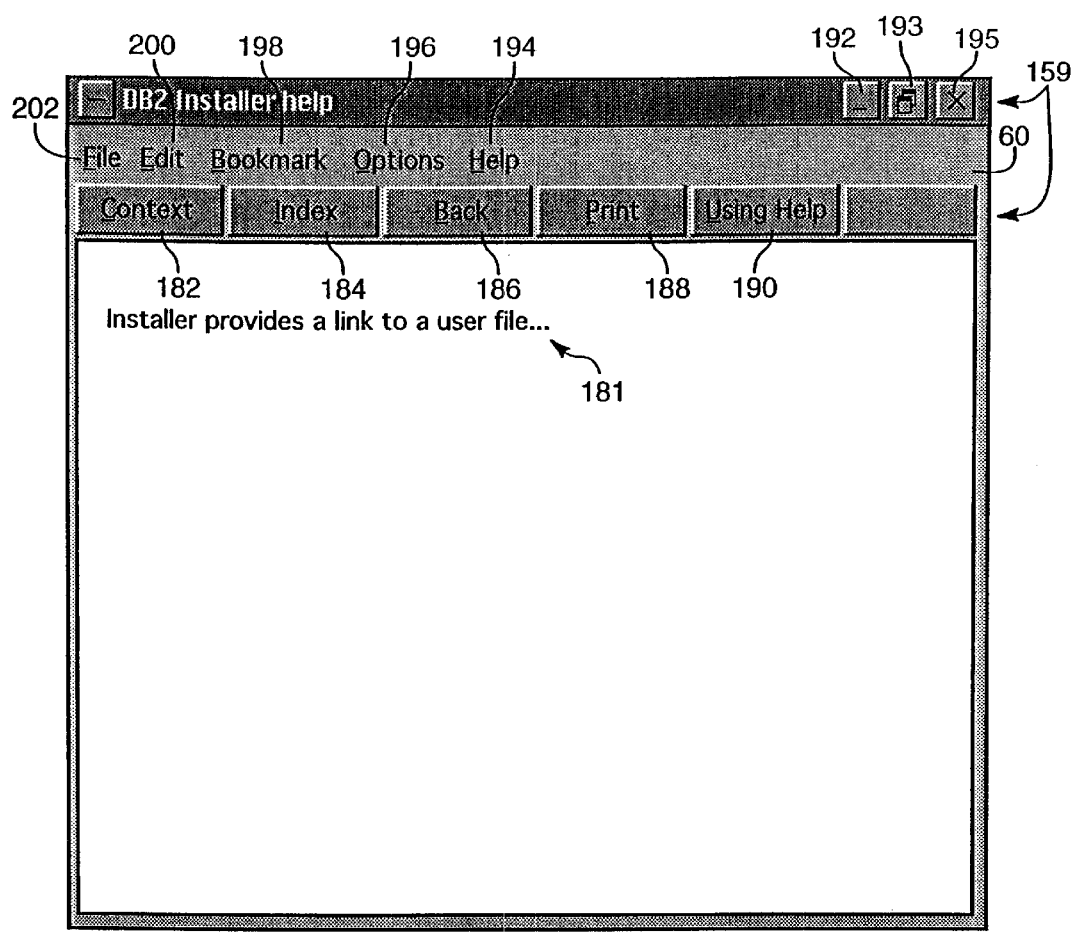
FIG. 5 is one embodiment of a graphical representation of the user interface corresponding to the standard help module of FIG. 2.

FIG. 5 illustrates one embodiment of a user interface corresponding to the standard help module 60 of FIG. 2. Seen therein are various buttons 159, a help topic text 181, a help menu 194, an options menu 196, a bookmark menu 198, an edit menu 200, and a file menu 202. The foregoing menus are preferably configured to enable a customer or user to beneficially employ the standard help module 60 to obtain information relating to the program 52 or the installation program 54, including information regarding the employment and maintenance of the user-generated documentation integration system 50.

The various buttons 159 of the depicted embodiment include a context button 182 for invoking context searching, an index button 184 for accessing the help index, a back button 186 for backtracking one step while using the standard help module 60 of FIG. 2, a print button 188 for printing help topics 87 of FIG. 2, a using help button 190 for accessing information related to using the standard help module 60, a minimize button 192 for minimizing the user interface but retaining it as an active process, an enlarge button 193 for enlarging the depicted window, and a cancel button 195 for closing the user interface corresponding to the standard help module 60.

FIG. 5 is but one example of a graphical representation of a user interface corresponding to the standard help module 60 of FIG. 2 and should not be considered limiting of the type, appearance, or nature of a user interface corresponding to the standard help module 60 of the present invention. Suitable types of user interfaces corresponding to the standard help module 60 are limited only in that they should be capable to serve as the medium by which a user, operator, or administrator interacts with the help topics 87 of FIG. 2.

Figure 6:
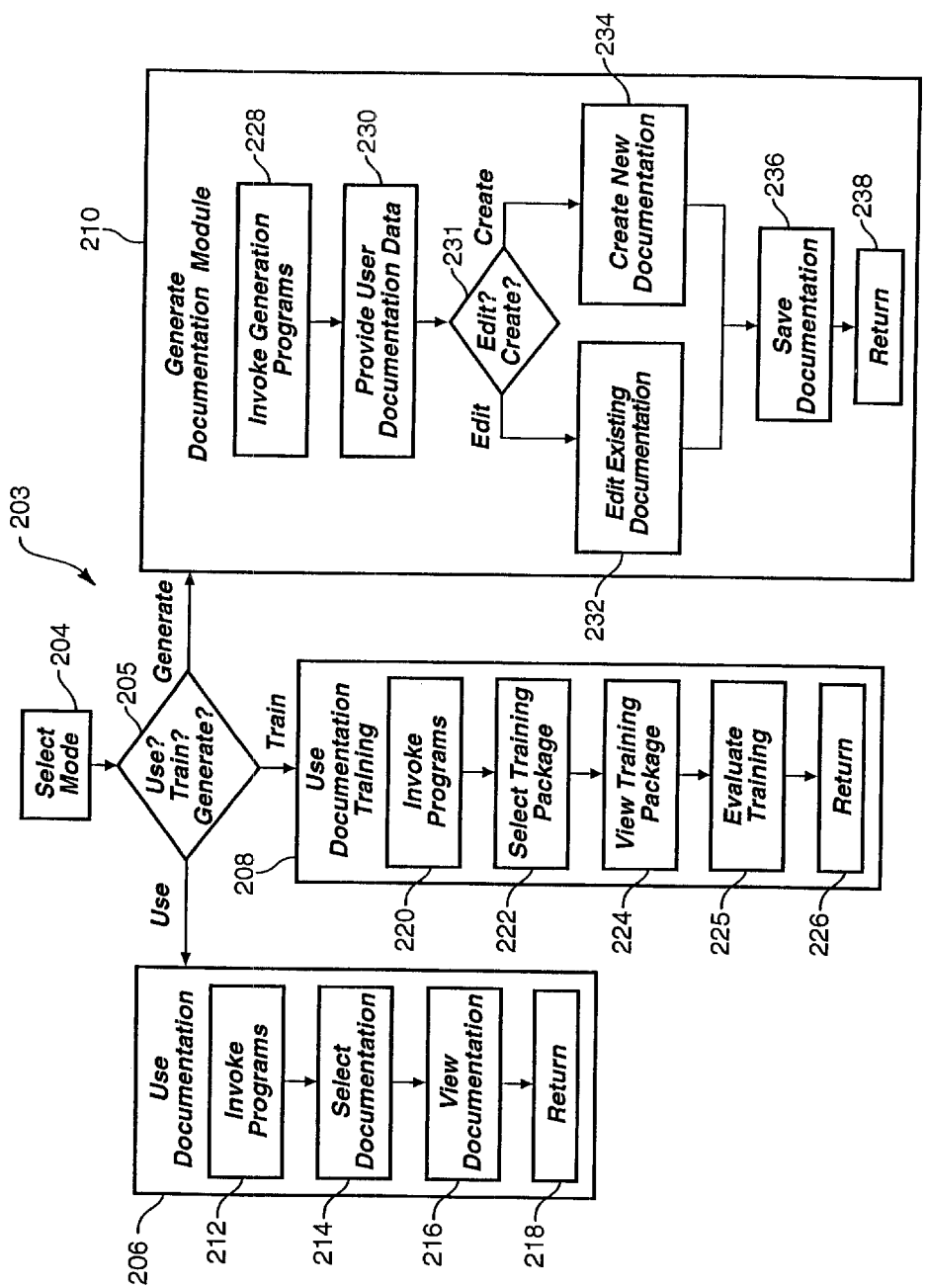
FIG. 6 is a schematic flow chart illustrating one embodiment of a process for using, training, and generating user-generated documentation in accordance with the present invention.

FIG. 6 is a schematic flow chart illustrating a method 203 of generating user-generated documentation, using user-generated documentation, and training with user-generated documentation in accordance with the system 50 of FIG. 2. The method 203 of FIG. 6 begins at a mode selection step 204. At the mode selection step 204, a user selects from among three processes, a use documentation process 206; a training process 208; and a generate documentation process 210. At a decision block 205, the method 203 receives the user input from the select mode step 204 and initiates the appropriate process 206, 208, 2 10. Not all users will necessarily be provided with all options 206, 208, 210. Furthermore, not all users will have the access rights to perform all methods 206, 208, 210. For example, a user may be required to be a supervisor or administrator as a prerequisite to being assigned the rights to generate user-generated documentation.

The user-generated documentation of the processes 206, 208, 210 is typically embodied as user documentation files 113 and may be selected and accessed in any of the methods illustrated in FIGS. 6, 7, and 8 to be hereinafter described. The user-generated documentation may be located on any storage device or storage devices 18 located on a local computer station 12 or located on a network 14, such as the Internet 40.

The use documentation process 206 may comprise an invoke programs step 212, a select documentation step 214, a view documentation step 216, and a return step 218. Referring to FIGS. 2 and 6, the invoke programs step 212, in one embodiment, involves invoking the programs necessary to employ the user-generated documentation, optionally including the program 52 or installation program 54, the help program or module 156, and the user-generated documentation menu item 84.

Referring to FIGS. 2 and 6, the select documentation step 214, in one embodiment, involves invocation of the user documentation menu item 84 to call the user interface 72, which presents a user with a listing of available user-generated documentation, as described above. In one embodiment, the view documentation step 216 involves invocation of a viewer 95 via the viewer launcher 78, which provides access to a user documentation file 113 for the benefit of a user. The return step 218 involves returning control to the calling program.

The training process 208 may comprise an invoke programs step 220, a select training step 222, a view training step 224, an evaluate training step 225, and a return step 226. Referring to FIGS. 2 and 6, the invoke programs step 220, in one embodiment, involves invoking the programs necessary to conduct training using user-generated documentation, optionally including the program 52 or installation program 54 and the training program or module 79.

In one embodiment, the select training package step 222 involves selection of the desired training data 81 from among available training data 81. The view training step 224 typically involves launching a viewer 95 under the control of the training module 79 and displaying user-generated documentation in an order and manner beneficial to a user for training purposes. The evaluate training step 225, in one embodiment, involves administration of a quiz or test to a user under the control of the training module 79 for assessing the effectiveness of the provided training. The training process 208 is not limited to the foregoing steps and may be embodied in any steps from which a user could derive training value from the selective use of the user-generated documentation.

The generate documentation process 210 may comprise an invoke generation programs step 228, a provide data step 230, a user selection step 231, an edit documentation step 232, a create documentation step 234, a save documentation step 236, and a return step 238.

Typically, the invoke generation programs step 228 involves invocation of an appropriate documentation generation program 137 of FIG. 2.

Referring to FIGS. 2 and 6, the provide data step 230 generally involves provision of information relating to the program 52 or installation program 54 beneficially communicated to a user or customer. In one embodiment, the steps of editing 232 and creating 234 user documentation files 113 involve the use of the selected documentation generation program 137 to alternatively edit an existing user documentation file 113 or create a new user documentation file 113.

The step of saving user-generated documentation 236 may involve the use of the file manager 68 to place the edited or created user documentation file 113 in a selected documentation repository 107. The return step 238 includes returning control to the calling program.

Figure 7:
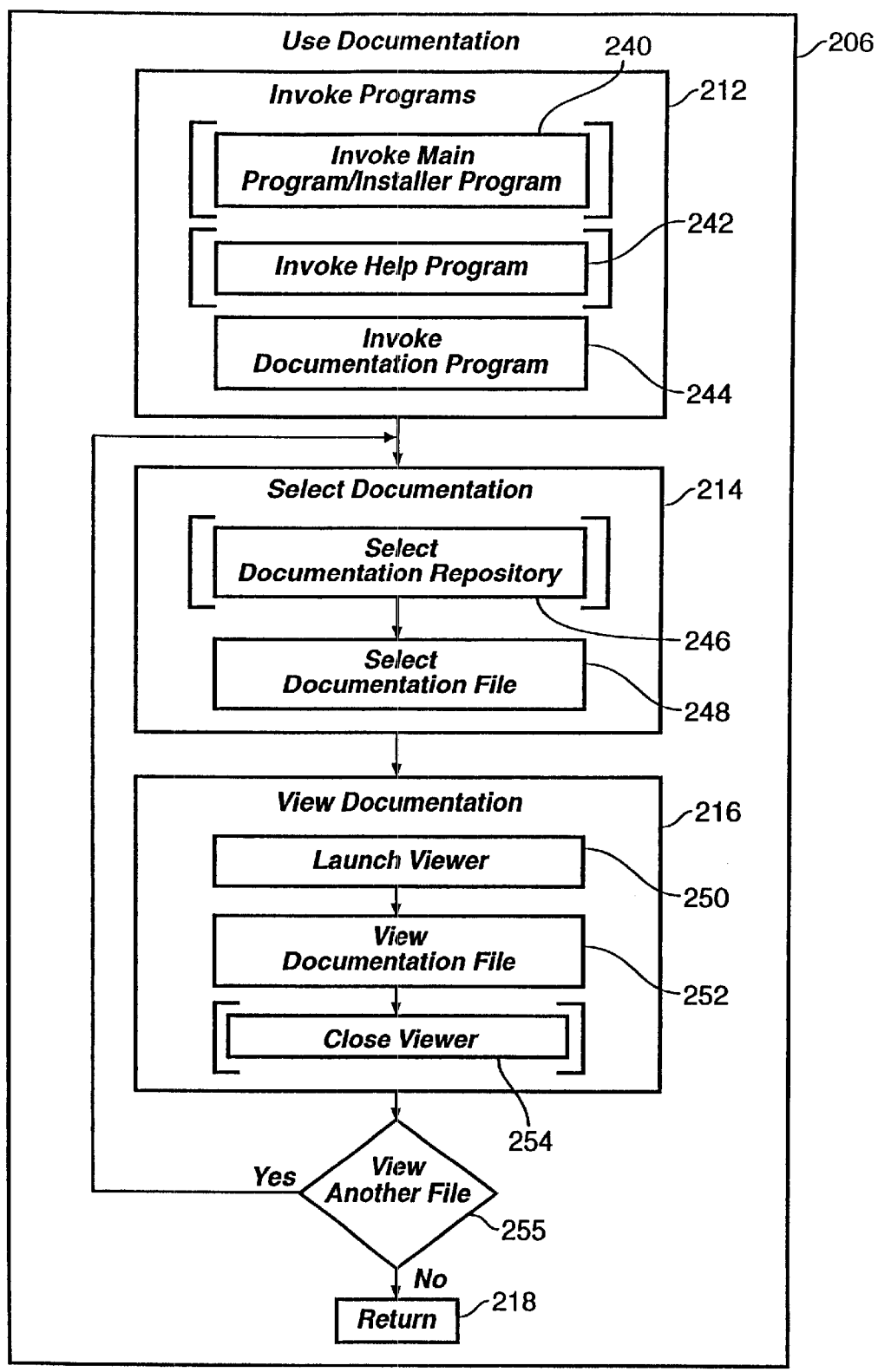
FIG. 7 is a schematic flow chart illustrating one embodiment of a method of using user-generated documentation in accordance with the present invention.

FIG. 7 is a schematic flow chart illustrating one manner of performing the steps of the user documentation process of FIG. 6. Blocks shown in brackets on FIG. 7 represent steps of further embodiments which may be employed by either including or omitting the bracketed steps.

As seen in FIG. 7, the invoke programs step 212 may further comprise an invoke program step 240 which may invoke either the program 52 or installation program 54. An invoke help program step 242 may invoke the help program 156. An invoke program step 244 is optional and may select the user documentation menu item 84 from the program window 58 of FIG. 2 or other suitable software construct, as discussed above.

The select documentation step 214 may further comprise a select documentation file step 248 to invoke the user documentation menu item 84, which calls the user interface 72, which may, in turn, present a user-selectable listing of available user documentation files 113 for a selection by a user. A select documentation repository step 246 may invoke the user documentation menu item 84 to call the user interface 72 of FIGS. 2 and 4. In response, a documentation repository selection control 160 may be presented to the user for selecting a documentation repository from among a group of available documentation repositories.

Referring to block 216, the view documentation step 216 may further comprise a launching viewer step 250 in which the viewer launcher 78 may be employed to invoke a viewer 95. A view user documentation file step 252 may be employed and may involve employing a viewer 95 to access a selected user documentation file 113. A close viewer step 254 may be optional for closing the viewer 95.

Additionally, the use documentation step 206 may also include a user selection step 255 in which a user has the option of returning to the select user documentation step 214 or terminating the use documentation process 206 and proceeding to the return step 218.

Figure 8:
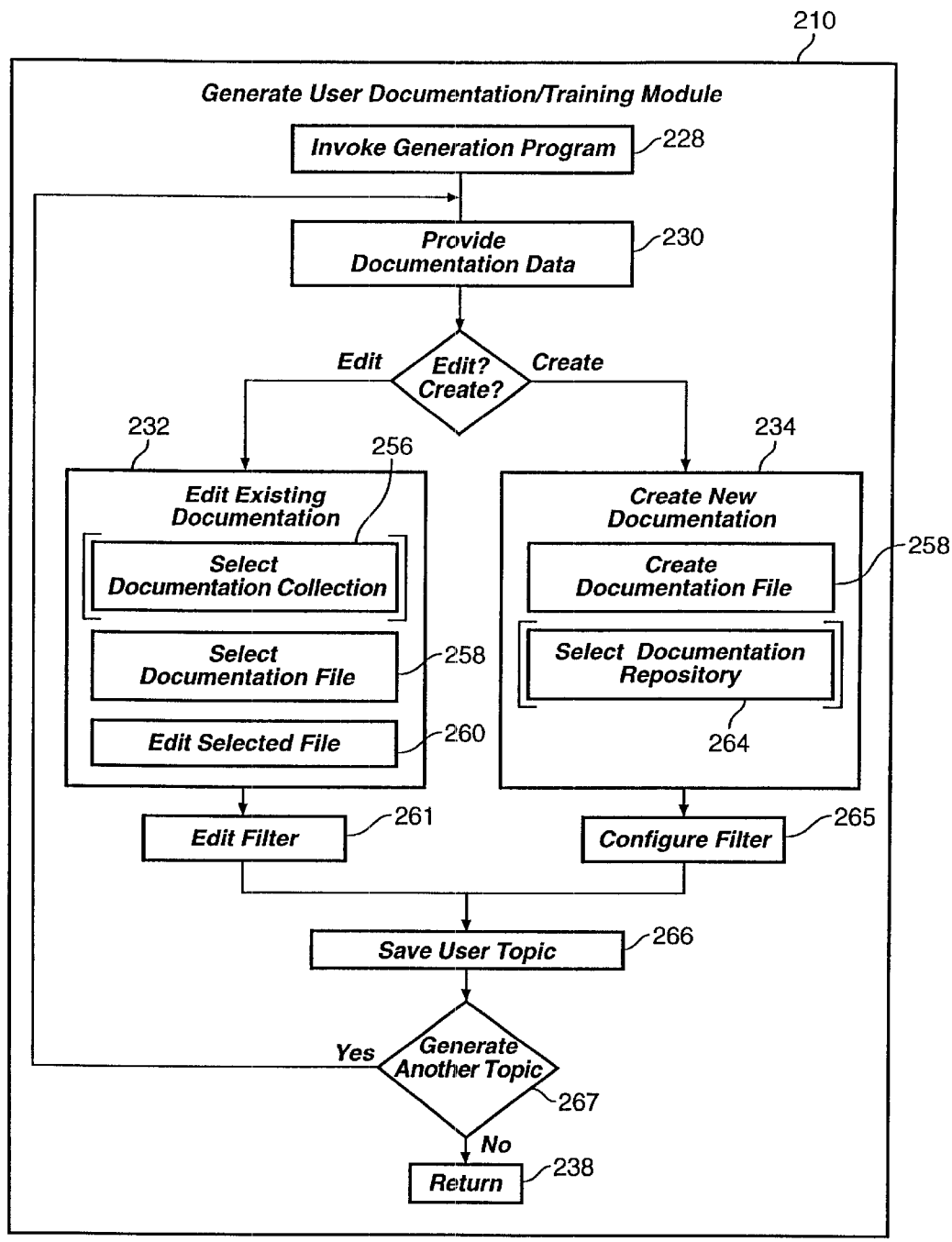
FIG. 8 is a schematic flow chart illustrating one embodiment of a method of creating or updating user-generated documentation in accordance with the present invention.

FIG. 8 is a schematic flow chart illustrating one manner of performing the steps of the generate documentation process 210 of FIG. 6. Blocks shown in brackets on FIG. 8 represent optional steps, resulting in further variation either including or omitting the bracketed steps.

As seen in FIG. 8, the edit documentation step 232 may further comprise a select documentation repository step 256 in which the user documentation menu item 84 may be invoked to call the user interface 72. In response, a documentation repository selection control 160 may be presented to the user for selecting a documentation repository from among a group of available documentation repositories. Also included may be a select user documentation file step 258 in which the user documentation menu item 84 may be selected to call the user interface 72, which may, in turn, present a user-selectable listing of available user documentation files 113 for a selection by a user.

An edit user documentation file step 260 may employ a documentation generation program 137 for altering the information contained in a selected user documentation file 113. Altering the information contained in a user documentation file 113 may involve adding information to, deleting information from, or modifying existing information in a selected user documentation file 113.

In the depicted embodiment, the edit documentation step 232 may additionally comprise an edit filter step 261 in which a user may employ the filter module to selectively edit assigned access rights of selected users for controlling access to one or more user documentation files 113 stored in one or more documentation repositories 107.

Referring to block 234, the creating new user-generated documentation step 234 may further comprise a create user documentation file step 258 in which a documentation generation program 137 may be employed to place information relating to the program 52 or installer program 54 into a user documentation file 113 and to save the user documentation file 113 into a selected documentation repository 107.

A select documentation repository step 264 enables a user documentation menu item 84 to be selected to call the user interface 72 of FIG. 2. Within the user interface 72, a user may use a documentation repository selection control 160 for selecting a documentation repository 107 from among a group of available documentation repositories 107.

In the depicted embodiment, the create documentation step 234 may additionally comprise a configure filter step 265 in which a user may employ the filter module 70 to selectively create and assign access rights to selected users. The assigned access rights are used by the filter module 70 to control access to one or more user documentation files 113 stored in one or more documentation repositories 107. Additionally, the generating user-generated documentation step 210 may also involve a user selection step 267 in which a user is provided with the option of returning to the provide user documentation data step 230 or terminating the generating user-generated documentation step 210 and proceeding to the return step 238.

One example in which the user documentation process 206 may be employed is a large governmental or private sector organization involved in the installation of a complex database system having as many as 300 configuration parameters on a group of mainframe computers located at physically distant sites all around large geographical region. In connection with using an installation program 54 to install the complex database system 52 on the group of mainframe computers 12 residing on a network 14, the organization may use the user-generated documentation integration system 50 for sharing information among system administrators and operators participating in the installation, such as required and preferred settings for configuration parameters. The administrators and operators may be located at different department sites participating in the installation.

In keeping with the above example, administrators and operators having appropriate supervisory rights may employ the generate user documentation process 210 to generate user-generated documentation defining configuration parameters to be used during the installation of the complex database system. The generation 210 of the user-generated documentation may occur at any of the department sites or at any other location having access to the network 14. Upon creation 258 of a user documentation file 113, an administrator or operator having rights may save 266 the user documentation file 113 into a selected documentation repository 107. The documentation repository 107 may be located at any of the sites participating in the installation or may be located at any other site having access to the network 14. The administrators and operators at the department sites participating in the installation of the complex database system may view 252 the user documentation file 113 to learn the correct configuration parameters to use during the installation of the database.

Access to the user documentation file 113 of the present example may be controlled through the use of the configure filter step 265 of FIG. 8. The administrators and operators may configure the filter 70 of FIG. 2 to permit access to the user documentation file 113 only to those operators and administrators that are desired to have rights for access thereto. As needs of the organization change, the filter controlling access to the documentation topic 113 may be altered through use of the edit filter step 261 of FIG. 8 to alter the group membership of those operators and administrators having rights to access the documentation topic 113.

Upon completion of the installation, the organization may use the user-generated documentation integration system 50 for sharing information relating to the installed database among system administrators and operators. The shared information may include organization, department, or site specific policies, procedures, or guidelines for using and maintaining the installed database. For example, the database may be configured to display information in accordance with defined views or filters. The system 50 may be concurrently used to train administrators of the database system how to configure and maintain such filters and to train users how to use and manipulate such filters. Users and administrators may also use such information as a form of customized online help during use of the database.

The user-generated documentation integration system 50, together with the associated methods for employing user-generated documentation 206, training with user-generated documentation 208, and generating user-generated documentation 210, provide unique advantages over currently available systems and methods. Indeed, many, if not all, of the problems discussed above are remedied by the present invention.

The present invention provides a convenient mechanism for integrally, seamlessly, and transparently providing temporarily or permanently useful information, such as installation and configuration information, policies, procedures, and guidelines specific to a company, department, and site during and prior to the installation. This greater availability of policies, procedures, or guidelines pertaining to the correct configuration for installation is of great assistance to users, operators, and administrators in accomplishing correct installation of complex software systems.

The sharable and dynamic nature of the user-generated documentation in accordance with the present invention enables the near real-time provision of the latest information regarding complex software systems to users and administrators, even when located several thousands of miles away.

Software manufacturers may also benefit from the capability of the present invention to provide information that becomes available only after a software application has been distributed to end users. Upon receipt of such information, such as bug fixes, the end users, who are typically customers of the manufacturer, can make such information from the manufacturer immediately available to geographically distributed users and administrators of the software application from a single repository or from a group of repositories. Access to such information may further be filtered to restrict access to those users and administrators with a need to know.

Customer policies, guidelines and procedures relevant to the software or desirable to be made available through the software may also be generated by the user at any time and be seamlessly integrated into the software. Indeed, an administrator at a central location may, under the present invention, generate or edit such information, and by placing it in a single location, make it selectively available to anyone within the same organization regardless of location.

Thus, the present invention enables administrators, operators, and users to share information, policies, procedures, and guidelines related to the installation, configuration, and use of software applications with other administrators, operators, and users who need or could benefit from access to such information.

The user-generated documentation of the present invention enjoys the advantage of being collected into a central repository and/or group of repositories where the documentation is readily accessible, even to users in remote locations. The present invention also enjoys the additional advantage of methods and apparatus for selectively controlling the availability of such documentation to users and groups of users.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for providing shared, dynamically customizable documentation for use in a software application, the apparatus comprising:
    a processor for executing instructions; and
    a memory device having thereon modules of operational data and executables for execution by the processor, the modules comprising:
        a software application generated by a manufacturer and executable by the processor for the benefit of a user;
        a documentation repository adapted to contain user-generated documentation relating to the software application;
        a documentation linker configured to access the documentation repository; and
        an invocation control accessible from within the software application and executable by the processor to invoke the documentation linker responsive to a user so user-generated documentation contained within the documentation repository is available to a user from the software application with the use of the invocation control.

2. The apparatus of claim 1, further comprising user-generated documentation contained in the documentation repository, the user-generated documentation including user help files.

3. The apparatus of claim 2, wherein the invocation control comprises a window adapted to display a listing of available user help files, the user help files individually selectable from the listing by a user for presentation on a display device.

4. The apparatus of claim 2, wherein the documentation repository appears to a user to be seamlessly integral to the software application.

5. The apparatus of claim 2, wherein the documentation repository comprises a directory generated by an operating system and external to the software application.

6. The apparatus of claim 2, wherein the documentation repository resides on a network at a location remote from the software application.

7. The apparatus of claim 6, wherein the network is the Internet.

8. The apparatus of claim 6, wherein the documentation linker is adapted to provide access to the documentation repository residing on the network at the remote location in a seamless manner so the documentation repository appears to a user to be integral to the software application, the processor to invoke the user interface responsive to a user.

9. The apparatus of claim 1, further comprising a collection module including a topic identifier adapted to identify user-generated documentation contained in the documentation repository.

10. The apparatus of claim 9, wherein the collection module further comprises a documentation repository selector adapted to enable a user to select a documentation repository from among a group of one or more documentation repositories.

11. The apparatus of claim 10, further comprising a viewer module having one or more viewers adapted to display the user-generated documentation to a user, the collection module further comprising a viewer launcher configured to launch the one or more viewers.

12. The apparatus of claim 9, wherein the collection module further comprises a training module and training data configured to employ the user-generated documentation to provide training related to the software application to a user.

13. The apparatus of claim 1, further comprising a filter module effective to selectively control access to the user-generated documentation contained in the documentation repository.

14. The apparatus of claim 13, wherein the filter module further comprises a security overlay configured to selectively grant access to the user-generated documentation to a user having rights to access the user-generated documentation.

15. The apparatus of claim 13, wherein the filter module further comprises a group assignor adapted to assign a user to a group of users having rights to access the user-generated documentation and an index adapted to track those users from the groups of users having rights to access the user-generated documentation.

16. The apparatus of claim 1, wherein the invocation control is also executable to invoke a standard help module configured to provide information to a user relating to the user-generated documentation.

17. A method for providing sharable, dynamically customizable software documentation, the method comprising:
    providing a software application executable on a processor;
    providing a documentation repository adapted to contain user-generated documentation;
    placing the user-generated documentation within the documentation repository;
    providing a user interface within the software application;
    linking the user interface to the documentation repository; and
    providing an invocation control accessible from the user interface and executable on the processor to invoke the user-generated documentation responsive to a user.

18. The method of claim 17, wherein the documentation repository comprises a directory generated by an operating system and external to the software application.

19. The method of claim 18, wherein the directory resides on a network at a location remote from the software application.

20. The method of claim 19, wherein the network is the Internet.

21. The method of claim 17, further comprising:
invoking the software application;
invoking the user interface;
selecting the user-generated documentation; and
accessing the user-generated documentation from the documentation repository and displaying the user-generated documentation on a display device for viewing by a user.

22. The method of claim 21, wherein selecting the user-generated documentation comprises:
providing a plurality of documentation repositories each containing a plurality of help files;
selecting a documentation repository from among the plurality of documentation repositories; and
selecting a help file from among the plurality of help files.

23. The method of claim 22, wherein accessing the user-generated documentation comprises:
providing a plurality of viewers adapted to display the plurality of help files;
providing a viewer launcher adapted to launch the plurality of viewers;
launching a viewer from among the plurality of viewers corresponding to a help file from among the plurality of help files; and
viewing the help file.

24. The method of claim 17, wherein invoking the user interface comprises designating a user-generated documentation option from within a menu of the software application, the user-generated documentation option being configured to concurrently invoke the user interface and a standard help program from within the software application.

25. The method of claim 17, further comprising:
providing a training module adapted to employ the user-generated documentation to provide training relating to the software application to a user; and
displaying the user-generated documentation to a user under the control of the training module for training purposes.

26. The method of claim 25, further comprising:
evaluating the effectiveness of training provided by administering an assessment.

27. The method of claim 17, further comprising:
providing user documentation data suitable for use in creating the user-generated documentation;
invoking a documentation generation program;
generating a help file; and
saving the help file to the documentation repository.

28. The method of claim 17, further comprising:
providing user documentation data suitable for use in editing the user-generated documentation;
invoking a documentation generation program;
providing a help file;
editing the help file; and
saving the help file to the documentation repository.

29. The method of claim 17, further comprising filtering access to the user-generated documentation.

30. An article of manufacture comprising a program storage medium readable by a processor and embodying one or more instructions executable by the processor to perform a method for providing shared, dynamically customizable, software documentation, the method comprising:
providing a software application executable on a processor;
providing a user interface within the software application;
linking the user interface to a documentation repository adapted to contain user-generated documentation; and
providing an invocation control accessible from the user interface and executable on the processor to invoke the user interface responsive to a user.

31. The article of manufacture of claim 30, wherein the method farther comprises:
providing user-generated documentation relating to the software application;
placing the user-generated documentation into the documentation repository;
invoking the software application;
invoking the user interface;
selecting the user-generated documentation; and
accessing the user-generated documentation from the documentation repository and displaying the user-generated documentation on a display device for viewing by a user.

32. The article of manufacture of claim 31, wherein invoking the user interface comprises designating a user-generated documentation option from within a menu of the software application, the user-generated documentation option being configured to concurrently invoke the user interface and a standard help program from within the software application.

33. The article of manufacture of claim 31, wherein selecting the user-generated documentation comprises:
providing a plurality of documentation repositories each containing a plurality of help files;
selecting a documentation repository from among the plurality of documentation repositories; and
selecting a help file from among the plurality of help files.

34. The article of manufacture of claim 33, wherein accessing the user-generated documentation comprises:
providing a plurality of viewers adapted to display the plurality of help files;
providing a viewer launcher adapted to launch the plurality of viewers;
launching a viewer from among the plurality of viewers corresponding to a help file from the plurality of help files; and
viewing the help file.

35. The article of manufacture of claim 30, wherein the method further comprises:
providing a training module adapted to employ the user-generated documentation to provide training relating to the software application to a user; and
displaying the user-generated documentation to a user under the control of the training module for training purposes.

36. The article of manufacture of claim 35, wherein displaying the training module further comprises:
evaluating the effectiveness of training provided by administering an assessment.

37. The article of manufacture of claim 30, wherein the method further comprises:
providing user documentation data suitable for use in creating the user-generated documentation;

invoking a documentation generation program;

generating a help file; and saving the help file to the documentation repository.

38. The article of manufacture of claim 30, wherein the method further comprises:

providing user documentation data suitable for use in editing the user-generated documentation;

invoking a documentation generation program;

providing a help file;

editing the help file; and saving the help file to the documentation repository.

39. The article of manufacture of claim 30, wherein the method further comprises filtering access to the user-generated documentation.

\* \* \* \* \*

UNITED STATES PATENT AND TRADEMARK OFFICE
CERTIFICATE OF CORRECTION

PATENT NO.     : 6,467,080 B1
DATED          : October 15, 2002
INVENTOR(S)    : Devine et al.

It is certified that error appears in the above-identified patent and that said Letters Patent is hereby corrected as shown below:

<u>Column 4,</u>
Line 19, "evaluate" should read -- an evaluation --.

<u>Column 6,</u>
Line 18, "28" should read -- 28, --.

<u>Column 11,</u>
Line 31, "user" should read -- user. --.

<u>Column 15,</u>
Line 42, "region" should read -- regions --.

<u>Column 20,</u>
Line 13, "farther" should read -- further --.

Signed and Sealed this

Eleventh Day of February, 2003

JAMES E. ROGAN
*Director of the United States Patent and Trademark Office*